(12) United States Patent
Zanghi

(10) Patent No.: US 11,224,238 B2
(45) Date of Patent: Jan. 18, 2022

(54) HYDRATION FOR ANIMALS

(71) Applicant: Societe des Produits Nestle SA, Vevey (CH)

(72) Inventor: Brian M Zanghi, Ballwin, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 1008 days.

(21) Appl. No.: 15/372,561

(22) Filed: Dec. 8, 2016

(65) Prior Publication Data

US 2017/0172180 A1 Jun. 22, 2017

Related U.S. Application Data

(60) Provisional application No. 62/269,185, filed on Dec. 18, 2015.

(51) Int. Cl.

| | | |
|---|---|---|
| A23L 33/19 | (2016.01) | |
| A23L 33/125 | (2016.01) | |
| A23K 50/48 | (2016.01) | |
| A23K 20/10 | (2016.01) | |
| A23L 29/30 | (2016.01) | |
| A23K 20/147 | (2016.01) | |
| A23K 20/111 | (2016.01) | |
| A23K 20/179 | (2016.01) | |
| A23K 20/163 | (2016.01) | |
| A23K 20/174 | (2016.01) | |

(52) U.S. Cl.
CPC .............. *A23K 50/48* (2016.05); *A23K 20/10* (2016.05); *A23K 20/147* (2016.05); *A23L 29/37* (2016.08); *A23L 33/125* (2016.08); *A23L 33/19* (2016.08); *A23K 20/111* (2016.05); *A23K 20/163* (2016.05); *A23K 20/174* (2016.05); *A23K 20/179* (2016.05)

(58) Field of Classification Search
CPC ...... A23K 50/48; A23K 20/147; A23K 20/10; A23K 20/163; A23K 20/179; A23K 20/111; A23K 20/174; A23L 33/19; A23L 29/37; A23L 33/125
See application file for complete search history.

(56) References Cited

U.S. PATENT DOCUMENTS

| | | | | |
|---|---|---|---|---|
| 5,811,600 A * | 9/1998 | Montner | ............ | A23L 2/38 536/1.11 |
| 6,485,764 B2 * | 11/2002 | Robergs | ............ | A23L 2/00 426/590 |
| 7,700,145 B1 * | 4/2010 | Zoltai | ............ | A23C 9/156 426/519 |
| 7,794,770 B2 * | 9/2010 | Sherwood | ............ | A23C 21/08 426/321 |
| 8,221,727 B2 * | 7/2012 | Albert | ............ | A61K 8/27 424/442 |
| 2002/0054947 A1 * | 5/2002 | Kloti | ............ | A23K 20/147 426/523 |
| 2003/0019162 A1 * | 1/2003 | Huang | ............ | A61Q 11/00 51/307 |
| 2003/0064104 A1 * | 4/2003 | Stillman | ............ | A23K 50/48 424/490 |
| 2009/0117224 A1 * | 5/2009 | Robergs | ............ | A23L 33/16 426/2 |
| 2009/0162485 A1 * | 6/2009 | Schmitt | ............ | A23C 21/00 426/72 |
| 2011/0151059 A1 * | 6/2011 | Xu | ............ | A23L 33/18 426/72 |
| 2011/0217410 A1 * | 9/2011 | Perlman | ............ | A23L 33/15 426/2 |
| 2012/0093973 A1 * | 4/2012 | Parthasarathy | ...... | A23K 20/174 426/2 |
| 2012/0171280 A1 * | 7/2012 | Zhang | ............ | A61P 7/04 424/450 |
| 2014/0141119 A1 * | 5/2014 | She | ............ | A23L 27/20 426/2 |
| 2014/0191388 A1 | 7/2014 | Chen | | |

FOREIGN PATENT DOCUMENTS

| | | |
|---|---|---|
| JP | S61277630 A | 12/1986 |
| JP | H09501399 A | 2/1997 |
| JP | 2012522505 A | 9/2012 |
| JP | 2014079238 A | 5/2014 |
| RU | 2375914 C2 | 12/2009 |
| RU | 2468596 C2 | 12/2012 |
| WO | 2002051443 A2 | 7/2002 |
| WO | 2011123760 A2 | 10/2011 |

OTHER PUBLICATIONS

Machine translation of WO2006119064 (Year: 2006).*
Machine translation of WO2008135960 (Year: 2008).*
International Search Report and Written Opinion PCT/IB2016/057428 dated Feb. 22, 2017.

* cited by examiner

*Primary Examiner* — Walter A Moore

(57) ABSTRACT

The invention provides composition and methods for improving hydration and water intake in an animal. In one embodiment, a hydration composition can comprise water and a hydration additive, where the hydration additive consists essentially of a sugar alcohol and a protein, where the sugar alcohol includes glycerol and the protein includes whey. Additionally, a method of improving hydration and water intake in an animal can comprise administering the hydration composition with water to the animal.

1 Claim, No Drawings

HYDRATION FOR ANIMALS

CROSS REFERENCE TO RELATED APPLICATIONS

This application claims priority to U.S. Provisional Application Ser. No. 62/269,185 filed Dec. 18, 2015, the disclosure of which is incorporated in its entirety herein by this reference.

BACKGROUND OF THE INVENTION

Field of the Invention

This invention relates generally to hydration in animals. In particular, the present invention relates to compositions and methods for improving hydration and water intake in an animal.

Description of Related Art

There is no doubt that maintaining adequate hydration is critical for health in animals. For example, physical activity is known to increase an individual's water requirement, particularly while exercising. Additionally, hydration can be challenging for companion animals. For example, promoting water intake and maintaining optimal hydration in senior cats, and also cats with urolithiasis, is important for improving health and hydration. In addition, stress related to travel, boarding, or illness also compromises hydration status in both cats and dogs, and consequently can diminish overall health.

As such, there remains a need for compositions and methods to improve water intake and hydration in an animal.

SUMMARY OF THE INVENTION

It is, therefore, an object of the present invention to provide compositions and methods useful for improving hydration and/or water intake in an animal.

In one embodiment, a hydration composition can comprise water and a hydration additive, where the hydration additive consists essentially of a sugar alcohol and a protein, where the sugar alcohol includes glycerol and the protein includes whey.

Additionally, in another embodiment, a method of improving hydration and water intake in an animal can comprise administering the hydration composition to the animal.

Further, in still another embodiment, a hydration additive can consist essentially of a sugar alcohol and a protein, where sugar alcohol includes glycerol and the protein includes whey.

DETAILED DESCRIPTION OF THE INVENTION

Definitions

The term "animal" means any animal that could benefit from one or more of the compositions and/or methods of the present invention including improving water intake and/or hydration in an animal. Generally, the animal is a human, avian, bovine, canine, equine, feline, hircine, lupine, murine, ovine, and porcine animal. In one aspect, the animal can be a companion animal.

The term "companion animal" refers to any domesticated animal, and includes, without limitation, cats, dogs, rabbits, guinea pigs, ferrets, hamsters, mice, gerbils, horses, cows, goats, sheep, donkeys, pigs, and the like. In one example, the companion animal can be a dog or cat.

The term "recommended daily requirement" or "recommended daily allowance" or "RDA" refers to the daily amount of a vitamin or other nutrient recommended by a recognized agency or standard within the art including without limitation, National Institutes of Health (NIH), Institute of Medicine of the National Academies (IOM), Dietary Reference Intake (DRI) Nutrient Report, The European Pet Food Industry Federation (FEDIAF), and The Association of American Feed control Officials (AAFCO) as of Jan. 1, 2015.

The term "aging" means being of advanced age such that the animal has exceeded 50% of the average lifespan for its particular species and/or breed within a species. For example, if the average lifespan for a given breed of dog is 10 years, then a dog within that breed greater than 5 years old would be considered "aging" for purposes herein. "Healthy aging animals" are those with no known diseases that might confound the results. In studies using healthy aging animals, cohort animals are also healthy aging animals, The term "long-term administration" means periods of repeated administration or consumption in excess of one month. Periods of longer than two, three, or four can be used for certain embodiments. Also, more extended periods that include longer than 5, 6, 7, 8, 9, or 10 months can be used. Periods in excess of 11 months or 1 year can also be used. Longer term use extending over 1, 2, 3, or more years can also be included in the invention. For certain aging animals, the animal will continue consuming on a regular basis for the remainder of its life. Sometimes this is referred to as consumption for "extended" periods.

The term "regular basis" means at least monthly dosing with the compositions or consumption of the compositions, and in some aspects, weekly dosing. More frequent dosing or consumption, such as twice, three, or seven times weekly, can be used in certain embodiments. Still other embodiments include regimens that comprise at least once daily consumption. The skilled artisan will appreciate that dosing frequency will be a function of the composition that is being consumed or administered, and some compositions may require more or less frequent administration to maintain a desired level of hydration.

The term "about" includes all values within a range of 5% of the stated number. In one embodiment, "about" includes all values within a range of 2%, and in one aspect, within 1%.

All percentages described herein are based on weight unless specifically identified otherwise.

The dosages expressed herein are in grams per kilogram of body weight per day (g/kg/day) unless expressed otherwise.

The term "individual" when referring to an animal means an individual animal of any species or kind.

As used throughout, ranges are used herein in shorthand, so as to avoid having to set out at length and describe each and every value within the range. Any appropriate value within the range can be selected, where appropriate, as the upper value, lower value, or the terminus of the range.

As used herein, embodiments, aspects, and examples using "comprising" language or other open-ended language can be substituted with "consisting essentially of" and "consisting of" embodiments, and vice versa.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a dog" or "a method" includes a plurality of such "dogs" or "methods". Reference herein, for example to "a hydration additive" includes a plurality of such additives, whereas reference to "B vitamins" includes a single B vitamin. Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The methods and compositions and other advances disclosed here are not limited to particular methodology, protocols, and compositions described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, certain compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved. Full citations for publications not cited fully within the specification are set forth at the end of the specification.

The Invention

The present inventors have discovered that certain compositions can provide increased water intake and/or hydration in an animal. Specifically, the inventors have discovered that the combination of whey and glycerol in water provides an unexpected increase in water intake and hydration effect in animals. Additionally, a method of improving hydration and water intake in an animal by administration of the presently described compositions is provided.

In one embodiment, a hydration additive can consist essentially of a sugar alcohol and a protein, where the sugar alcohol includes glycerol and the protein includes whey. In another embodiment, hydration compositions can include such hydration additives to water or other liquids. Such compositions provide an unexpected benefit over similar compositions as described herein.

For example, the present inventor has unexpectedly discovered that a hydration composition comprising a water additive that includes glycerol and whey provides better hydration and water intake than a composition that includes glycerol, whey, and taurine, even though taurine can be shown to provide a hydration effect. As such, the present water additives consist essentially of a sugar alcohol and protein, and therefore, generally exclude taurine, additional amino acids, proteins, or other additives that can materially affect the presently discovered water intake and hydration properties as described herein. In one aspect, the hydration composition and/or hydration additive can exclude proteins other than whey, sugar alcohols other than glycerol, and/or amino acids. In one embodiment, the sugar alcohol can consist of glycerol. In another embodiment, the protein can consist of whey. In still another embodiment, the water additives can consist of a sugar alcohol and a protein, and in one aspect, the water additives can consist of glycerol and whey.

In one embodiment, a method for improving water intake and hydration in an animal can comprise administering a hydration composition to the animal, wherein the hydration composition comprises water and a hydration additive, wherein the hydration additive consists essentially of a sugar alcohol and a protein, where the sugar alcohol comprises glycerol and the protein comprises whey.

Generally, the present hydration compositions can be administered to an animal sufficient to provide increased water intake and hydration to the animal. As such, in one embodiment, the administration can be on a regular basis, e.g., on a daily basis. Generally, the composition can be administered in an amount of 10 g/kg/day to 100 g/kg/day to the animal. In one embodiment, the composition can be administered in an amount of 15 g/kg/day to 62 g/kg/day. The hydration compositions can be premixed or admixed just prior to administering to the animal. As such, the present methods include the hydration additive being admixed with the water prior to administration, e.g., within 10 minutes, 1 hour, or even within 1 day prior to administration.

As described herein, the hydration composition can be administered to provide increased water intake and hydration. In one embodiment, the hydration composition can be administered in an effective amount to increase hydration as measured by a reduction in the urine specific gravity of the animal. In one aspect, the urine specific gravity can be lowered to below 1.040 g/ml. In another aspect, the urine specific gravity can be lowered to below 1.035 m/ml, below 1.030 g/ml, below 1.025, or even below 1.020. Additionally, the urine specific gravity (uSG) can be lowered by at least 50%, 40%, 30%, 20%, 10% or even 5% as compared to a comparable animal that is administered water without the present hydration additives where the percent reduction is measured by the ratio between (1) the difference between the uSG of the comparable composition and the test composition and (2) the difference between the uSG of the test composition and water; i.e. Percent reduction=[[(uSG Comparable)−(uSG Test)]/(uSG Comparable)−(uSG water)]*100, where the uSG of water is 1.0. Additionally, in one embodiment, the hydration composition can be administered in an effective amount on a daily basis to increase the water intake of the animal by 15% by weight per week. In other aspects, the increase water intake can be by 20%, by 25%, or even by 30% by weight per week.

Generally, the sugar alcohol and the protein are present as hydration additives although other ingredients may be present as discussed herein. In one embodiment, the sugar alcohol can be present in the hydration additive in an amount of about 10% to about 50% by weight. In one aspect, the sugar alcohol can be present in an amount of about 25% to about 35%. In one embodiment, the protein can be present in the hydration additive in an amount of about 40% to about 90% by weight. In one aspect, the protein can be present in an amount of about 65% to about 75% by weight. Additionally, when in a hydration composition, the hydration additives can be present in an amount of about 0.1% to about 10% by weight. In one aspect, the hydration additives can be present in an amount of about 1% to about 5% by weight. In another aspect, the hydration additives can be present in an amount of about 2% to about 4% by weight.

While the present hydration compositions and hydration additives can be formulated for any animal, in one embodiment, the hydration compositions and hydration additives are formulated for companion animals. In one aspect, the companion animal can be a canine. In another aspect, the companion animal can be a feline.

Such hydration compositions and hydration additives can further comprise other ingredients that can serve to promote the health of the animal. In one embodiment, the compositions and additives can further comprise a gum. In one aspect, the gum can be selected from the group consisting of guar gum, xanthan gum, kappa-carragenan, locust bean gum, and mixtures thereof. In one embodiment, the compositions and additives can further comprises an antioxidant. In one aspect, the antioxidant can be selected from the group consisting of vitamin A, vitamin C, vitamin E, beta-carotene, alpha-carotene, beta-cryptoxanthin, gamma-carotene, lutein, astaxanthin, selenium, zeaxanthin, melatonin, N1-Acetyl-5-methoxykynuramine, N1-acetyl-N2-formyl-5-methoxykynuramine, N1-acetylkynuramine, resveratrol, anthocyanins and/or anthocyanidins, curcumin, desmethoxycurcumin, bis-desmethoxycurcumin, Epigallocatechin gallate, and mixtures thereof. In one embodiment, the compositions and additives can further comprise a vitamin. In one aspect, the vitamin can be selected from the group consisting of vitamin A, vitamin B1, vitamin B2, vitamin B3, vitamin B5, vitamin B6, vitamin B7, vitamin B8, vitamin B9, vitamin B12, vitamin C, vitamin D, vitamin E, vitamin K, choline, betaine, and mixtures thereof. In another aspect, the compositions and additives can further comprise maltodextrins and dextrose and starches as sources of readily digestible carbohydrates.

While the present hydration compositions generally comprise water, the present hydration additives generally consist essentially of a sugar alcohol and a protein, allowing them to be formulated as a concentrate. As such, in one embodiment, the hydration additives can be a supplement. In one aspect, the hydration additives can be delivered via a sachet. In another embodiment, the hydration additive can be a dry powder. As discussed herein, such additives and compositions would exclude any amino acids, proteins, sugar alcohols, or other components that would materially affect the water intake and hydration properties of the present compositions and additives. In one embodiment, a hydration additive can consist essentially of a sugar alcohol and a protein, wherein the sugar alcohol comprises glycerol and the protein comprises whey, wherein the sugar alcohol is present in the hydration additive in an amount of about 25% to about 50% by weight, and the protein is present in the hydration additive in an amount of about 50% to about 75% by weight.

In other embodiments, the compositions and additives can further comprise prebiotics, probiotics, or a combination thereof. Probiotics are live microorganisms that have a beneficial effect in the prevention and treatment of specific medical conditions when ingested. Probiotics are believed to exert biological effects through a phenomenon known as colonization resistance. The probiotics facilitate a process whereby the indigenous anaerobic flora limits the concentration of potentially harmful (mostly aerobic) bacteria in the digestive tract. Other modes of action, such as supplying enzymes or influencing enzyme activity in the gastrointestinal tract, may also account for some of the other functions that have been attributed to probiotics. Prebiotics are non-digestible food ingredients that beneficially affect host health by selectively stimulating the growth and/or activity of bacteria in the colon. Prebiotics include fructooligosaccharides (FOS), xylooligosaccharides (XOS), galactooligosaccharides (GOS), and mannooligosaccharides (typically for non-human foods such as petfoods). The prebiotic, fructooligosaccharide (FOS) can be found naturally in many foods such as wheat, onions, bananas, honey, garlic, and leeks. FOS can also be isolated from chicory root or synthesized enzymatically from sucrose. FOS fermentation in the colon results in a large number of physiologic effects including increasing the numbers of bifidobacteria in the colon, increasing calcium absorption, increasing fecal weight, shortening of gastrointestinal transit time, and possibly lowering blood lipid levels. The increase in bifidobacteria has been assumed to benefit animal health by producing compounds to inhibit potential pathogens, by reducing blood ammonia levels, and by producing vitamins and digestive enzymes. Probiotic bacteria such as Lactobacilli or Bifidobacteria are believed to positively affect the immune response by improving the intestinal microbial balance leading to enhanced antibody production and phagocytic (devouring or killing) activity of white blood cells. *Bifidobacterium lactis* could be an effective probiotic dietary supplement for enhancing some aspects of cellular immunity in the elderly. Probiotics enhance systemic cellular immune responses and may be useful as a dietary supplement to boost natural immunity in otherwise healthy adults. Probiotics include many types of bacteria but generally are selected from four genera of bacteria: *Lactobacilllus acidophillus, Bifidobacteria, Lactococcus*, and *Pediococcus*. Beneficial species include *Enterococcus* and *Saccharomyces* species. The amount of probiotics and prebiotics to be administered to the animal is determined by the skilled artisan based upon the type and nature of the prebiotic and probiotic and the type and nature of the animal, e.g., the age, weight, general health, sex, extent of microbial depletion, presence of harmful bacteria, and diet of the animal. Generally, probiotics are administered to the animal in amounts of from about one to about twenty billion colony forming units (CFUs) per day for the healthy maintenance of intestinal microflora, preferably from about 5 billion to about 10 billion live bacteria per day. Generally, prebiotics are administered in amounts sufficient to positively stimulate the healthy microflora in the gut and cause these "good" bacteria to reproduce. Typical amounts are from about one to about 10 grams per serving or from about 5% to about 40% of the recommended daily dietary fiber for an animal. The probiotics and prebiotics can be made part of the composition by any suitable means. Generally, the agents can be mixed with the composition or applied to the surface of the composition, e.g., by sprinkling or spraying, or be provided in a supplement.

The compositions may further comprise substances such as minerals, vitamins, salts, nutrients, functional additives including, for example, palatants, colorants, emulsifiers, antimicrobial or other preservatives. Minerals that may be useful in such compositions include, for example, calcium, phosphorus, potassium, sodium, iron, chloride, boron, copper, zinc, magnesium, manganese, iodine, selenium and the like. Examples of additional vitamins useful herein include vitamin B and such fat soluble vitamins as D and K. Inulin, amino acids, taurine, choline, enzymes, coenzymes, and the like may be useful to include in various embodiments.

The B vitamins can be any B vitamin suitable for administration to an animal. B vitamins include vitamin B1 (thiamine), vitamin B2 (riboflavin), vitamin B3 (niacin, nicotinic acid, nicotinamide), vitamin B5 (pantothenic acid), vitamin B6 (pyridoxine, pyridoxal, pyridoxamine), vitamin B7 (biotin), vitamin B8 (myo-inositol), vitamin B9 (folic acid) vitamin B12 (cobalamin compounds including methylcobalamin, hydroxocobalamin, and cyanocobalamin), or salts, conjugates, or derivatives thereof recognized of found to have B vitamin activity. Combinations of any of the foregoing are also useful herein and are sometimes referred to herein as "mixtures" of B vitamins.

The antioxidants can be any antioxidant suitable for administration to an animal. Antioxidants are well known in the art, particularly the art of food technology and food formulation. Natural antioxidant compounds include vitamins (such as A, C and E, and derivative, conjugates, or analogs thereof), as well as plant extracts, including extracts from fruit, vegetables, herbs, seeds, and other types and/or parts of plants. Compounds such as α-lipoic acid, chlorophyll and derivatives thereof, glutathione, ubiquinols (e.g., coenzyme Q10), carotenoids (e.g., beta-carotene, alpha-carotene, beta-cryptoxanthin, gamma-carotene, lutein, astaxanthin, and zeaxanthin etc.), flavonoids, phenolic acids and polyphenols, and pycnogenol are known to be excellent antioxidants. Some examples of plant sources of antioxidants include those from fruits such as berries (cherry, blackberry, strawberry, raspberry, crowberry, blueberry, bilberry/wild blueberry, black currant), pomegranate, grape, orange, plum, pineapple, kiwi fruit, and grapefruit; those from vegetables including kale, chili pepper, red cabbage, peppers, parsley, artichoke, Brussels sprouts, spinach, lemon, ginger, garlic, and red beets; those from dry fruits like apricots, prunes, and dates; from legumes including broad beans, pinto beans, and soybeans. Also nuts and seeds such as pecans, walnuts, hazelnuts, ground nut, and sunflower seeds; cereals such as barley, millet, oats, and corn. Many natural antioxidants are also available from a wide variety of spices including cloves, cinnamon, rosemary, and oregano. Less widely known sources of antioxidants include *Ginkgo biloba*, and tropical plants such as uyaku, and *Carica papaya*. Antioxidant properties of various teas and green tea, as well as fermented products such as red wine, have become of great interest in recent years and such would be suitable for use herein. Selenium is an excellent oxygen scavenger and works well, especially with vitamin or related tocopherol compounds. Synthetic dietary antioxidants include butylated hydroxyanisole (BHA) and butylated hydroxytoluene (BHT) which are commonly used in food products. Any of the foregoing, alone or in combination, are suited for use herein, as are combinations of natural and synthetic antioxidants. In one embodiment, the antioxidants comprise astaxanthin alone or in combination with other antioxidants.

Additionally, the composition and additives can comprise from about 0.1 to 40 times the recommended daily requirement (RDA) of minerals and vitamins and from about 0.0001% to about 25% of antioxidants. In various embodiments, the minerals and vitamins comprise from about 0.1 to 20 times the RDA, and in one aspect, from about 0.1 to 10 times the RDA, and antioxidants comprise from about 0.0001% to about 15%, in one aspect, from about 0.001% to about 5%, and in one specific aspect, from about 0.001% to about 2%.

In another embodiment, the composition and additives can be a dietary supplement such as a gravy, gel, drinking water, beverage, yogurt, powder, granule, paste, suspension, chew, morsel, treat, snack, pellet, pill, capsule, tablet, or any other suitable delivery form. The dietary supplement can comprise a high concentration of the hydration additives, probiotics, prebiotics, minerals, vitamins and/or antioxidants. This permits the supplement to be administered to the animal in small amounts, or in the alternative, can be diluted before administration to an animal. The dietary supplement may require admixing, or can be admixed with water or other diluent prior to administration to the animal as discussed herein.

In one embodiment, the compositions can be refrigerated or frozen compositions. In another embodiment, the hydration additives can be pre-blended with the other components to provide the beneficial amounts needed.

The compositions and dietary supplements may be specially formulated for the intended recipients or consumers, such as for adult animals or for older or young animals. For example, a composition adapted for puppies or kittens or adapted for active, pregnant, lactating, or aging animals can be prepared. In general, specialized compositions will comprise energy and nutritional requirements appropriate for animals at different stages of development or age.

Certain aspects of the invention can be used in combination with a complete and balanced food. According to certain embodiments provided herein, the compositions comprising the hydration additives, probiotics, prebiotics, minerals, vitamins, and/or antioxidants, can be used with a high-quality commercial food. As used herein, "high-quality commercial food" refers to a diet manufactured to produce the digestibility of the key nutrients of 80% or more, as set forth in, for example, the recommendations of the National Research Council above for dogs, or in the guidelines set forth by the Association of American Feed Control Officials. Similar high nutrient standards would be used for other animals.

The skilled artisan will also appreciate that in formulating the hydration compositions and additives of the invention, the formulation may vary slightly, so as to allow consideration by the formulator of the price and/or availability of certain ingredients in the compositions, as well as the batch-to-batch variation in the analysis of certain ingredients. Thus a given hydration composition or additive may vary slightly from batch to batch, plant to plant, or even season to season depending on such factors. Notwithstanding such variation in specific ingredients selected for manufacturing a particular batch of a food composition, the overall composition (for example, analysis of protein, amino acid, water content, or other component) may be held constant or at least substantially constant, for example, in accordance with a label claim, such as a claim or guarantee of a minimum or maximum percent of a particular component.

Administration in accordance with the methods can be on an as-needed or as-desired basis of varying or regular frequency. A goal of regular ingestion is to provide the animal with a regular and consistent dose of the composition. Such regular and consistent dosing will tend to provide for improved hydration. Thus, administration on a regular basis can be once monthly, once weekly, once daily, or more than once daily. Similarly, administration can be every other day, week, or month, every third day, week, or month, every fourth day, week, or month, and the like. Administration can be multiple times per day. When utilized as a supplement to ordinary dietetic requirements, the composition may be administered directly to the animal, e.g., orally, or otherwise. The compositions can alternatively be contacted with, or admixed with, daily feed or food, including a fluid, such as drinking water, or an intravenous connection for an animal that is receiving such treatment. When utilized with a daily feed or food, administration will be well known to those of ordinary skill.

Administration can also be carried out as part of a dietary regimen for the animal. For example, a dietary regimen may comprise causing the regular ingestion by the animal of a composition described herein in an amount effective to promote or improve hydration and/or water intake in the animal.

According to the methods of the invention, administration of the compositions, including administration as part of a dietary regimen, can span a period of time ranging from parturition through the adult life of the animal. In certain embodiments, the animal can be a young or growing animal. In other embodiments, the animal can be an aging animal. An animal that has reached about 35% of its projected lifespan can be included. In some embodiments, administration begins, for example, on a regular or extended regular basis, when the animal has reached more than about 30%, 40%, or 50% of its projected or anticipated lifespan. In some embodiments, the animal can have attained 40, 45, or 50% of its anticipated lifespan. In yet other embodiments, the animal can be older having reached 60, 66, 70, 75, or 80% of its likely lifespan. A determination of lifespan may be based on actuarial tables, calculations, estimates, or the like, and may consider past, present, and future influences or factors that are known to positively or negatively affect lifespan. Consideration of species, gender, size, genetic factors, environmental factors and stressors, present and past health status, past and present nutritional status, stressors, and the like may also influence or be taken into consideration when determining lifespan.

In a further aspect, the invention provides kits suitable for administering a hydration composition or hydration additive to the animal. The kits can comprise in separate containers in a single package or in separate containers in a virtual package, as appropriate for the kit component, (a) water, and/or (b) hydration additives; and (1) other ingredients suitable for consumption by an animal, (2) a prebiotic, (3) a probiotic, (4) a vitamin, (5) an antioxidant, (6) instructions for how to combine or prepare the water and hydration additives and any other ingredients provided in the kit for administration to an animal; (7) instructions for how to use the combined kit components, prepared kit components, or other kit components for the benefit of an animal; and/or (8) a device for administering the combined or prepared kit components to an animal. The components are each provided in separate containers in a single package or in mixtures of various components in different packages. The kits may comprise the ingredients in various combinations. For example, the kit could comprise a mixture of water additives in one container and one or more other ingredients in one or more other containers. Other such combinations can be produced by the skilled artisan based upon the characteristics of the ingredients and their physical and chemical properties and compatibilities.

In another aspect, the invention provides a means for communicating information about or instructions for one or more of (1) using compositions and hydration additives of the present invention for promoting or improving hydration; (2) admixing the water, hydration additives, or other components of the invention to produce a composition suitable for promoting or improving hydration; (3) using the kits of the present invention for promoting or improving hydration; and (4) administering the compositions to an animal. The means comprises one or more of a physical or electronic document, digital storage media, optical storage media, audio presentation, audiovisual display, or visual display containing the information or instructions. In one embodiment, the means can be selected from the group consisting of a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof.

In another aspect, the present invention provides a package comprising a composition of the present invention and a label affixed to the package containing a word or words, picture, design, acronym, slogan, phrase, or other device, or combination thereof, that indicates that the contents of the package contains a composition suitable for promoting and/or improving hydration in an animal. Typically, such device comprises the words "improves hydration", or an equivalent expression printed on the package. Any package or packaging material suitable for containing the composition can be useful in the invention, e.g., a bag, box, bottle, can, pouch, and the like manufactured from paper, plastic, foil, metal, and the like. In a one embodiment, the package can contain a food composition adapted for a particular animal such as a canine or feline, as appropriate for the label, in one aspect, a companion animal food composition.

In the invention, the animal can be a juvenile, adult, senior, or geriatric animal. In one embodiment, the animal can be an aging animal. Generally, animals can be senior in the last half of their expected lifespan and geriatric in the last fourth of their expected lifespan. Lifespan definitions vary for various animals and are known to skilled artisans. For a dog or cat, the animal can be considered to be juvenile until 1 year of age.

EXAMPLES

The invention can be further illustrated by the following example, although it will be understood that this example is included merely for purposes of illustration and is not intended to limit the scope of the invention unless otherwise specifically indicated.

Example 1—Hydration Study for Felines

A single trial was performed to evaluate liquid consumption over 21 days. Urine parameters were measured at baseline and at various intervals (days) after providing the test liquid as an alternative to water. All test liquids contain dry animal digest, at 1.0%. The formulas are listed in Table 1. The study was designed to be an incomplete cross-over; in which four separate cat rooms (N=7-9 cats per room) had access to only one water-treatment paired with a dry kibble food (ProPlan Dry Cat Chicken and Rice). The water treatment changed between the periods, thus facilitated N=24-27 observations for each water treatment.

TABLE 1

| Formula | Guar (wt %) | Xanthan (wt %) | Whey (wt %) | Taurine (wt %) | Glycerin (wt %) |
|---|---|---|---|---|---|
| Test liquid 1 | 0.4 | 0.06 | 2.4 | 1.0 | 1.0 |
| Test liquid 2 | 0.4 | 0.04 | — | 1.0 | 1.0 |
| Test liquid 3 | 0.4 | 0.04 | 2.4 | 1.0 | — |
| Test liquid 4 | 0.4 | 0.04 | 2.4 | — | 1.0 |

In summary, the study design monitored daily water and food intake with cats in group housing that leveraged the use of the automated feeding systems. The testing period consisted of a 7-d baseline, in which all cats had access to tap water only through the feeding system. Following the baseline, a 21 day treatment period was initiated. On days −4, 3, 8, 15, and 21 of the treatment phase, urine (cystocentesis) samples were collected and analyzed for specific gravity.

Overall, study data revealed that cats drinking a prototype liquid with glycerin and whey protein, as a replacement of tap water, demonstrated an unexpected improvement in hydration status and greatest intake of the test liquid. Notably, Test Liquid 4 containing 1% glycerin and 2.4% whey provided better results than similar compositions including 1% Glycerine/2.4% Whey/1% Taurine; 1% Glycerine/1% Taurine; and 2.4% Whey/1% Taurine. Such results were wholly unexpected.

The total daily liquid amount consumed for each treatment group as well as a control group was collected over time (days) with the data presented in table 2 of daily liquid ingested per formula in grams. On Days 3, 8, 15, 16, 17, and 18, cats were moved from normal room for sample collection, thus liquid intake was influenced in all cats and recorded data was removed from the data set. Cats consuming the Test Liquids 3 and 4 had the greatest initial (40-90%) and sustained increase in total daily liquid ingestion during the 3 week treatment period. On average, 20-50 mL more volume of the test liquids were consumed daily during week 1 and 2. Test Liquid 4 was unexpectedly superior to Test Liquids 1-3.

TABLE 2

| TL* | Day # | | | | | | | | | | | | | | |
|---|---|---|---|---|---|---|---|---|---|---|---|---|---|---|---|
| | 1 | 2 | 4 | 5 | 6 | 7 | 9 | 10 | 11 | 12 | 13 | 14 | 19 | 20 | 21 |
| 0** | 111 | 89 | 142 | 123 | 124 | 115 | 107 | 117 | 106 | 122 | 115 | 80 | 105 | 114 | 102 |
| 1 | 163 | 141 | 157 | 156 | 131 | 130 | 142 | 145 | 150 | 144 | 146 | 117 | 116 | 141 | 146 |
| 2 | 157 | 112 | 147 | 149 | 138 | 132 | 143 | 134 | 128 | 141 | 130 | 116 | 117 | 125 | 105 |
| 3 | 214 | 149 | 163 | 170 | 141 | 137 | 221 | 146 | 137 | 143 | 145 | 131 | 125 | 134 | 126 |
| 4 | 203 | 169 | 178 | 152 | 181 | 159 | 172 | 166 | 151 | 173 | 131 | 148 | 141 | 148 | 151 |

*TL is test liquid corresponding to formulas 1-4 with total daily average ingested liquid measured in grams for each day measured, based on N = 24 to 27 cats for each test liquid or tap water.
**Tap water is acting as a control.

Urine specific gravity (uSG) was measured in urine samples collected by cystocentesis during baseline and on days 3, 8, and 15 of each treatment period. Baseline uSG was 1.050 and was no different for cats in the tap water groups during the 3 treatment periods. Interestingly, while all test liquids resulted in a reduction of uSG throughout the 15 day treatment period, Test Liquid 4 was consistently superior.

TABLE 3

| Formula | Day | | |
|---|---|---|---|
|  | 3 | 8 | 15 |
| control | 1.050 | 1.049 | 1.051 |
| Test Liquid 1 uSG (g/ml) | 1.041 | 1.040 | 1.043 |
| Test Liquid 2 uSG (g/ml) | 1.038 | 1.038 | 1.042 |
| Test Liquid 3 uSG (g/ml) | 1.037 | 1.043 | 1.042 |
| Test Liquid 4 uSG (g/ml) | 1.030 | 1.031 | 1.034 |

Example 2—Hydration Study for Felines

A single trial was performed to evaluate liquid consumption over 56 days. Urine parameters were measured at baseline and at various intervals (days). All test liquids contain animal digest at 1.0%. Gum systems for solid suspension functionality—summarized below in table 4.

TABLE 4

| Formula | Guar (wt %) | Xanthan (wt %) | Whey (wt %) | Glycerin (wt %) |
|---|---|---|---|---|
| Test liquid 1 | 0.1 | 0.01 | 1.2 | 1.0 |
| Test liquid 2 | 0 | 0 | 2.4 | 1.0 |

A study consisted of a 7-d baseline, in which all cats had access to only tapwater and dry food through the use of a 2-bowl monitoring system. Following the baseline, a 56-d treatment phase was initiated. The study was designed to assess 3 different groups of cats, in which three separate cat rooms (N=9 cats per room) had access to only one water-treatment paired with a dry kibble food. Cats were fed a prototypical chicken and rice dry kibble food formulated to meet adult maintenance nutrient requirements (Nestle Purina PetCare, St. Louis, Mo.).

The treatment phase was sub-divided to evaluate a 2-bowl or 3-bowl food/water regimen. On days 1-11 of the treatment phase, the cats assigned to either test groups had ad libitum access to a nutrient-enriched test water and food within the automated monitoring system, whereas the control group of cats had ad libitum access to tap water and food within the automated monitoring system. This is representative of the 2-bowl food/water regimen. Starting on day 12 until the end of trial, a 3-bowl food/water regimen was implemented with food available ad libitum outside of the automated monitoring system (no monitoring of food intake) for all groups of cats. Water treatment for the test groups was representative of ad libitum access to both tap water and the same nutrient-enriched test water from days 1-11 in the automated monitoring system, whereas cats in the control group received tap water in both bowls in each feeder.

QMR was used to monitor total body water (TBW) and fat mass (FM) at baseline and 4 different measurement times over the 8-week treatment period. QMR can uniquely monitor shifts in total body water and body compositional proportions relative to ingestion of the treatment liquids. On days −1, 8, 15, 30, and 56 of the treatment phase, body composition measurements of cats using QMR were recorded between 8 and 10 AM for total body water (TBW), lean body mass (LBM), fat mass (FM), and free water (FW). On these days urine (cystocentesis) was collected (days −1, 8, 15, 30, and 56) and urine samples were analyzed for specific gravity. Urine output volume was measured for 48 hours from days 28-30.

Daily Liquid Consumption Amount:

Pre-trial tapwater drinking (7-d baseline weekly average water intake) was not different (ANOVA p=0.75) between the 3 treatment groups (Table 2). Tap water intake in the control group was relatively consistent throughout the entire baseline and treatment phase, in which weekly average of daily tapwater consumption ranged from 89-119 mL per day (Table 5). By contrast, liquid intake of the test waters, whether alone (week 1 and 2) or in the presence of tapwater (week 2-8) was at least 15% higher (week 2—test liquid 1) compared to the tap water, and as high as 208% greater (week 1—test liquid 2).

TABLE 5

| | 7-d average of liquid ingestion volume measured in mL | | | | | | | | |
|---|---|---|---|---|---|---|---|---|---|
| | baseline | Week 1 | Week 2 | Week 3 | Week 4 | Week 5 | Week 6 | Week 7 | Week 8 |
| control[a] | 96 ± 9 | 89 ± 7 | 110 ± 8 | 102 ± 12 | 108 ± 9 | 112 ± 8 | 101 ± 7 | 119 ± 11 | 100 ± 7 |
| Test liquid 1 | 86 ± 7 | 148 ± 25 | 126 ± 14 | 132 ± 18 | 168 ± 32 | 193 ± 35 | 169 ± 33 | 164 ± 29 | 155 ± 32 |
| Test liquid 2 | 101 ± 11 | 273 ± 53 | 249 ± 65 | 217 ± 44 | 185 ± 29 | 189 ± 33 | 202 ± 29 | 175 ± 24 | 154 ± 16 |

[a]control = control tap water group

Hydration Markers—Urine

Two-day urine volume (mL per kg BW) was measured during week 4 of the treatment phase (day 28-31) while the cats were temporarily housed in the metabolism cages. The group mean output was greater by 67% for test liquid 1 and test liquid 2 was 89% greater in cats compared to cats ingesting tapwater alone (Table 6).

TABLE 6

| | | Trial study days | | | | |
|---|---|---|---|---|---|---|
| | | Baseline | Test water phase | | | |
| | | −1 | 8 | 15 | 30 | 56 |
| Urine output volume, mL/kg BW | control[a] | nd | nd | nd | 11.2 ± 0.9 | nd |
| | Test liquid 1 | nd | nd | nd | 18.7 ± 2.5 | nd |
| | Test liquid 2 | nd | nd | nd | 21.2 ± 4.7 | nd |
| Specific gravity, g/mL | control[a] | 1.058 ± 0.002 | 1.052 ± 0.002 | 1.053 ± 0.003 | 1.055 ± 0.002 | 1.052 ± 0.002 |
| | Test liquid 1 | 1.053 ± 0.004 | 1.031 ± 0.004 | 1.038 ± 0.005 | 1.037 ± 0.004 | 1.041 ± 0.005 |
| | Test liquid 2 | 1.053 ± 0.004 | 1.031 ± 0.004 | 1.038 ± 0.005 | 1.037 ± 0.004 | 1.041 ± 0.005 |

[a]control = control tap water group
[b]nd: not determined

Urine specific gravity (uSG) was measured in urine samples collected by cystocentesis during baseline and on days 8, 15, and 56. Baseline uSG was 1.053-1.058 and analysis of treatment group differences was controlled for uSG during baseline. A main effect of treatment group was observed (ANOVA $p<0.0001$) with uSG lower for both test liquid 1 ($p<0.001$) and test liquid 2 ($p=0.02$) compared to tapwater control. Although the interaction between day and treatment was not significant (ANOVA $p=0.50$), the greatest decrease in uSG occurred during the first week of treatment (Table 6).

Body Composition

Total Body Water

For the control group and cats ingesting test liquid 2, total body water content remained within 0.5% during the entire 8 week treatment period. Test liquid 1 group had on average a sustained 1.3% increase in TBW (Table 7), which may be related to the inclusion of the 0.11% gums in the liquid.

Body Fat

Body fat amount did not differ (ANOVA $p=0.10$) between the treatment groups drinking the prototype liquids or tap-water. In addition, cats drinking either test liquids or tap-water had no change in their % body fat (Table 7).

The data confirms that cats ingested significantly more of two similar test liquid that included 1.) 1% glycerine plus 1.2% whey and 0.11% gums (Test liquid 1) or 2.) 1% glycerine plus 2.4% whey and no gums (Test liquid 2) compared to tap water. This data supports Example 1, such that the inclusion of glycerine plus whey drives liquid intake.

Furthermore, test liquid 2 with 1% glycerine/2.4% whey/no gums shows the benefit of immediately (initial 3 days) increasing liquid volume ingestion.

In the specification, there have been disclosed typical embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

What is claimed is:

1. A hydration additive consisting of glycerol and whey, wherein the glycerol is present in the hydration additive in an amount of about 25% to about 50% by weight, and the

TABLE 7

Group mean (+/−SE) of body composition measures in cats ingesting either tap water or test water.

| | Trial study days | | | | |
|---|---|---|---|---|---|
| | Base- | Test phase | | | |
| | line −1 | 8 | 15 | 30 | 56 |
| Total body water, g (% BW) | | | | | |
| Control tap water group | 2423 ± 105 (56.0) | 2321 ± 116 (54.7) | 2381 ± 117 (55.6) | 2363 ± 117 (55.3) | 2368 ± 119 (55.4) |
| Test water 1 group | 2410 ± 117 (50.6) | 2392 ± 111 (50.8) | 2468 ± 117 (51.9) | 2443 ± 111 (51.8) | 2455 ± 116 (51.9) |
| Test water 2 group | 2655 ± 125 (50.9) | 2618 ± 110 (49.5) | 2696 ± 117 (50.3) | 2626 ± 110 (49.7) | 2674 ± 108 (50.2) |
| Body fat, g (% BW) | | | | | |
| Control tap water group | 846 ± 151 (18.2) | 804 ± 149 (17.5) | 796 ± 151 (17.1) | 815 ± 168 (17.3) | 825 ± 188 (17.1) |
| Test water 1 group | 1069 ± 126 (21.9) | 1047 ± 130 (21.6) | 1018 ± 128 (20.8) | 1019 ± 135 (20.9) | 1027 ± 138 (20.9) |
| Test water 2 group | 1234 ± 116 (23.4) | 1235 ± 119 (23.0) | 1221 ± 116 (22.5) | 1258 ± 121 (23.4) | 1259 ± 125 (23.1) | whey is present in the hydration additive in an amount of about 50% to about 75% by weight.

\* \* \* \* \*